US006601628B2

(12) United States Patent
Yeh

(10) Patent No.: US 6,601,628 B2
(45) Date of Patent: Aug. 5, 2003

(54) STICKER MACHINE WITH PRESSURE APPLYING STRUCTURE

(76) Inventor: Teng-Tsung Yeh, P.O. Box No. 6-57, Chung-Ho City, Taipei Hsien 235 (TW)

( * ) Notice: Subject to any disclaimer, the term of this patent is extended or adjusted under 35 U.S.C. 154(b) by 95 days.

(21) Appl. No.: 09/783,314

(22) Filed: Feb. 15, 2001

(65) Prior Publication Data

US 2002/0108718 A1 Aug. 15, 2002

(51) Int. Cl.[7] .......................... B32B 31/00; B65C 11/00

(52) U.S. Cl. ....................... 156/540; 156/528; 156/541; 156/542; 156/556; 156/579

(58) Field of Search ................................ 156/528, 540, 156/541, 542, 556, 566, 574, 576, 577, 579, 580, 584, DIG. 33

(56) References Cited

U.S. PATENT DOCUMENTS

| | | | | | |
|---|---|---|---|---|---|
| 426,729 | A | * | 4/1890 | Mast | 156/528 |
| 546,769 | A | * | 9/1895 | Martin et al. | 156/534 |
| 648,941 | A | * | 5/1900 | Frentzel | 156/573 |
| 708,424 | A | * | 9/1902 | Strong | 144/119.1 |
| 1,755,926 | A | * | 4/1930 | Leguillon et al. | 12/59.5 |
| 1,809,875 | A | * | 6/1931 | Swallow | 156/540 |
| 5,770,008 | A | * | 6/1998 | Murphy | 156/541 |
| 5,988,252 | A | * | 11/1999 | Carroll | 156/442 |

* cited by examiner

*Primary Examiner*—Richard Crispino
*Assistant Examiner*—Sue A. Purvis
(74) *Attorney, Agent, or Firm*—Troxell Law Office PLLC

(57) ABSTRACT

The invention herein providing a sticker machine with pressure applying structure comprises of an arresting gear, a driven gear and the sticker body, wherein the arresting gear further consists of a press-down portion, a resilient spring and a pressed portion; a receiving chamber is mounted at the center of the press-down portion for receiving the resilient spring; the pressed portion is disposed at the bottom side of the press-down portion with the center available for inserting in the projecting rod of the receiving chamber; the driven gear moves along with the depressed movement of the arresting gear; the sticker body comprises of oilpaper and adhesive patterns positioned on the lower surface of oilpaper with adhesive layer coated on the bottom side; when the press-down portion of the arresting gear is depressed downwards, it presses the pressed portion downwards and synchronously links the movement of the driven gear on the side; the adhesive patterns of the sticker body move to the bottom side of the pressed portion to be pressed by the arresting gear and be adhered to the predetermined locations.

7 Claims, 3 Drawing Sheets

STICKER MACHINE WITH PRESSURE APPLYING STRUCTURE

BACKGROUND OF THE INVENTION

1. Field of the Invention

The invention herein provides a sticker machine with pressure applying structure, especially a machine structure using the force exerted from the arresting gear to link the movement of the driven gear to enable the adhesive patterns to be adhered to the predetermined locations.

2. Description of the Prior Art

The stickers widely available in the markets with diverse patterns in brilliant colors have been favored by a lot of customers. The common stickers mainly use oilpaper in proper sizes with several printed patterns placed and spaced apart thereon; the place where the bottom side of the sticker attached to oilpaper is coated with the adhesive layer of certain viscosity.

Although the conventional sticker is easily to be peeled off from oilpaper for conducting adhering operation, the sticker needs to be removed manually; since the user's hand will touch the adhesive layer at the bottom side of the sticker, the viscosity of the adhesive layer touched by the hand will be reduced, or the adhesive layer will be easily separated from the sticker and stuck to the hand. Therefore, the sticker not only fails in fulfilling the purpose of being adhered to the desired location, but also becomes vulnerable to stain or destruction during selling, operating or storing.

In view of the necessary solution of the problems of being easily stained or destroyed of the conventional sticker, the inventor of the invention herein, based on the rich and practical experience of engaging in the research, designing, manufacturing and constructing of the related products for many years, after continuous study and experiment, finally and successfully developed the invention herein of a sticker machine with pressure applying structure to rid the shortcomings easily deviated from the operation and management of the present sticker.

SUMMARY OF THE INVENTION

Specifically, the invention herein of a sticker machine with pressure applying structure mainly comprises of an arresting gear, a driven gear and the sticker body, the arresting gear further consists of a pressure-down portion, a resilient spring and a pressed portion; a receiving chamber is mounted at the center of the press-down portion for receiving the resilient spring; the pressed portion is disposed at the bottom side of the press-down portion with the center available for inserting in the projecting rod of the receiving chamber; the driven gear moves along with the depressed movement of the arresting gear; the sticker body comprises of oilpaper and adhesive patterns positioned on the lower surface of oilpaper with adhesive layer coated on the bottom side.

The primary objective of the invention herein is to provide the structure of the sticker machine mentioned above, when the press-down portion of the arresting gear is depressed downwards, it presses the pressed portion downwards and synchronously links the movement of the driven gear on the side; the adhesive patterns of the sticker body move to the bottom side of the pressed portion to be pressed by the arresting gear, to be adhered to the predetermined locations and to release oilpaper outwards.

To enable a further understanding of the structural features, the effect and the purposes of the invention herein, the brief description of the drawings below is followed by the detailed description of the preferred embodiments.

DETAILED DESCRIPTION OF PREFERRED EMBODIMENTS

Figure 2:
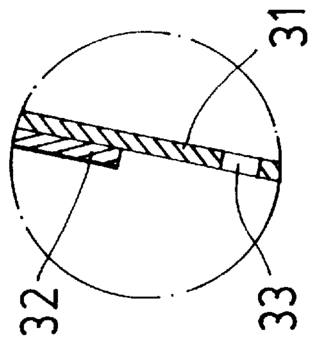
FIG. 2 is an enlarged drawing of Part A of FIG. 1.
Figure 1:
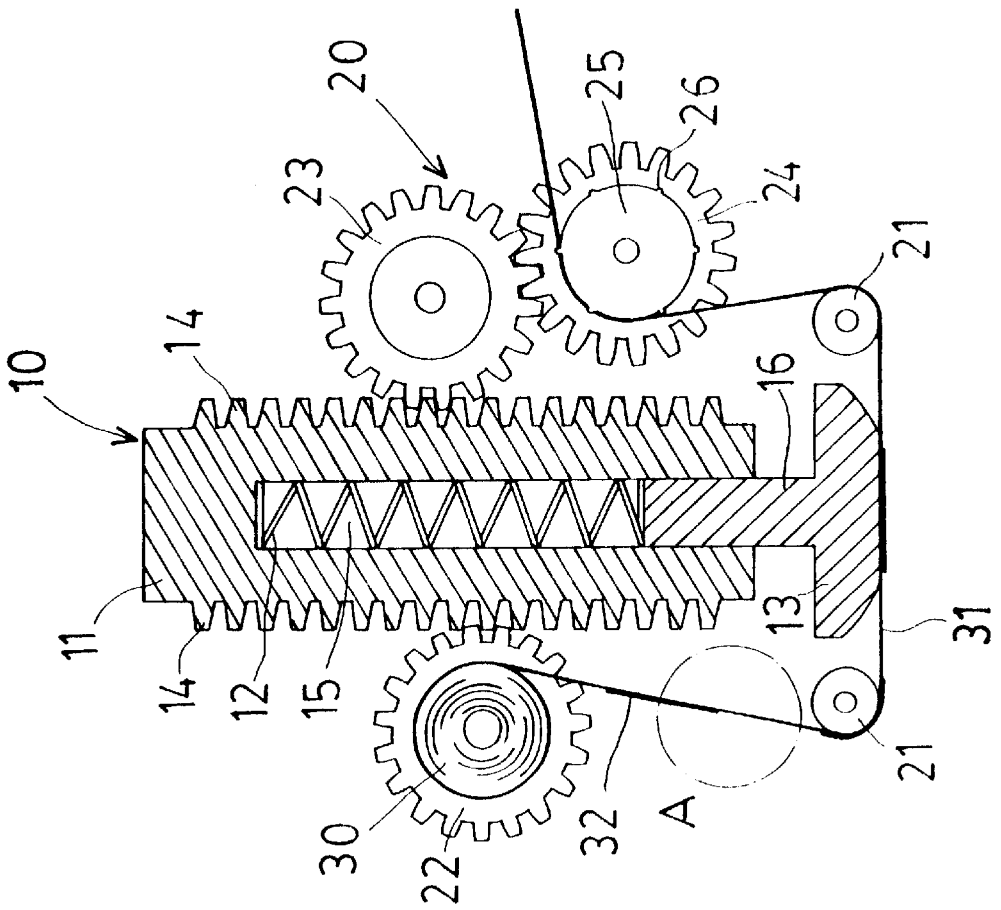
FIG. 1 is a structural isometric drawing of the first preferred embodiment of the invention herein.

Referring to FIGS. 1 & 2, the sticker machine with pressure applying structure mainly comprises of an arresting gear (10), a driven gear (20) and a sticker body (30), wherein:

The arresting gear (10) further consists of a press-down portion (11), a resilient spring (12) and a pressed portion (13); there are gear teeth (14) mounted on the sides of the press-down portion (11) with receiving chamber (15) disposed downwards at the center; the resilient spring (12) is placed inside the receiving chamber (15); the pressed portion (13) is set on the bottom side of the press-down portion (11) and is pressed downwards along with the movement of the press-down portion (11); a projecting rod (16) is located at the center of the pressed portion (13) to be inserted into the receiving chamber (15).

The driven gear (20) further consists of a set of auxiliary wheels (21), the first, the second and the third wheel members (22, 23, 24), wherein the set of auxiliary wheels (21) are positioned on the two sides of the pressed portion (13); the first and the second wheel members (22, 23) are one-way wheels set on the two sides of the pressed portion (11) and mesh with the gear teeth (14); the third wheel member (24) meshes with the second wheel member (23) and has a dragging wheel (25) with several convex portions (26) on the circumferential ring.

The sticker body (30) is rolled on the first wheel member (22) and consists of oilpaper (31) and adhesive patterns (32); the positioning holes (33) are spaced apart on the oilpaper (31); the adhesive patterns (32) are placed and spaced apart between two positioning holes (32) on the lower surface of oilpaper (31); the adhesive layer is coated on the bottom side of the adhesive pattern (32); the sticker body is coiled around the set of auxiliary wheels (21) and the third wheel member (24) to be released outwards; the positioning holes (33) interlock with the convex portions (26) on the dragging wheel (25).

Figure 3:
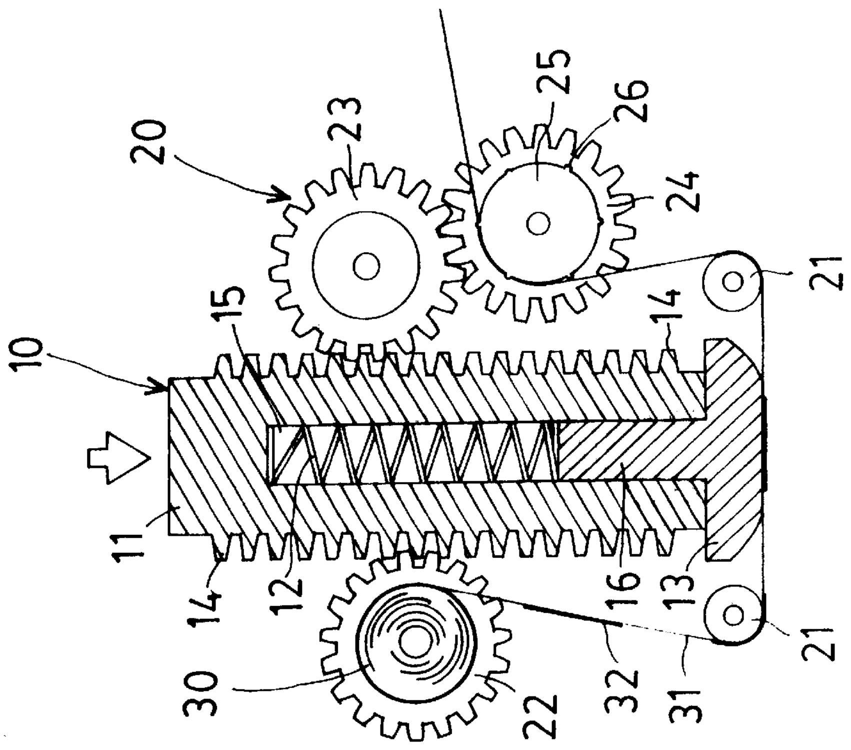
FIG. 3 is a drawing of the arresting gear in the status of being depressed downwards.

Referring to FIG. 3, when the press-down portion (11) of the arresting gear (10) is depressed downwards, its bottom end is pressed onto the pressed portion (13), at the mean time, the resilient spring (12) inside the receiving chamber (15) is pressed into a status of compression; when the press-down portion (11) presses downwards, it synchronously links the turning of the first and the second wheel members (22, 23) of the driven gear (20) on the side; when the first and the second wheel members (22, 23) turn, the third wheel member (24) meshed with the second wheel member (23) turns accordingly.

When the first and the second wheel members (22, 23) turn, the sticker body (30) positioned on the first wheel member (22) gradually releases and moves the adhesive pattern (32) to the bottom side of the pressed portion (13); when the press-down portion (11) of the arresting gear (10) is depressed and links the pressed portion (13) to move downwards, the adhesive pattern (32) can be adhered to the predetermined location by the force exerted from the press-down portion (11); furthermore, when the third wheel member (24) turns, the convex portions (26) of the dragging wheel (25) will drag the positioning holes (33) to release oilpaper (31) outwards.

Figure 4:
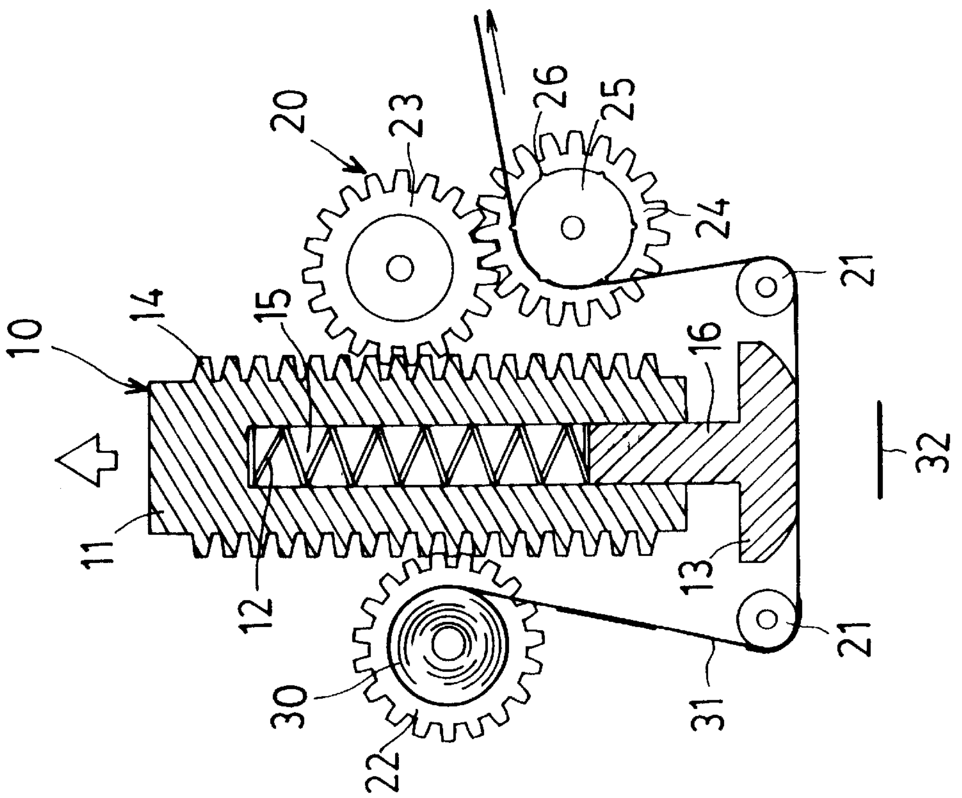
FIG. 4 is a drawing of the arresting gear in the status of moving upwards.

When the said sticker body (30) finishes the adhering operation, the press-down portion (11) will be released from the status of being depressed (referring to FIG. 4); at this time, the press-down portion (11) moves upwards by the resilient and resuming force of the resilient spring (12) inside the receiving chamber; when it moves upwards, the pressed portion (13) is in a status of no pressure, therefore, as the sticker machine conducts the adhesion of the next adhesive pattern (32), oilpaper (31) of the sticker body (30) will smoothly pass the bottom side of the pressed portion (13) and release outwards by the interlock between the positioning holes (33) and the convex portions (26) on the dragging wheel (25).

Figure 5:
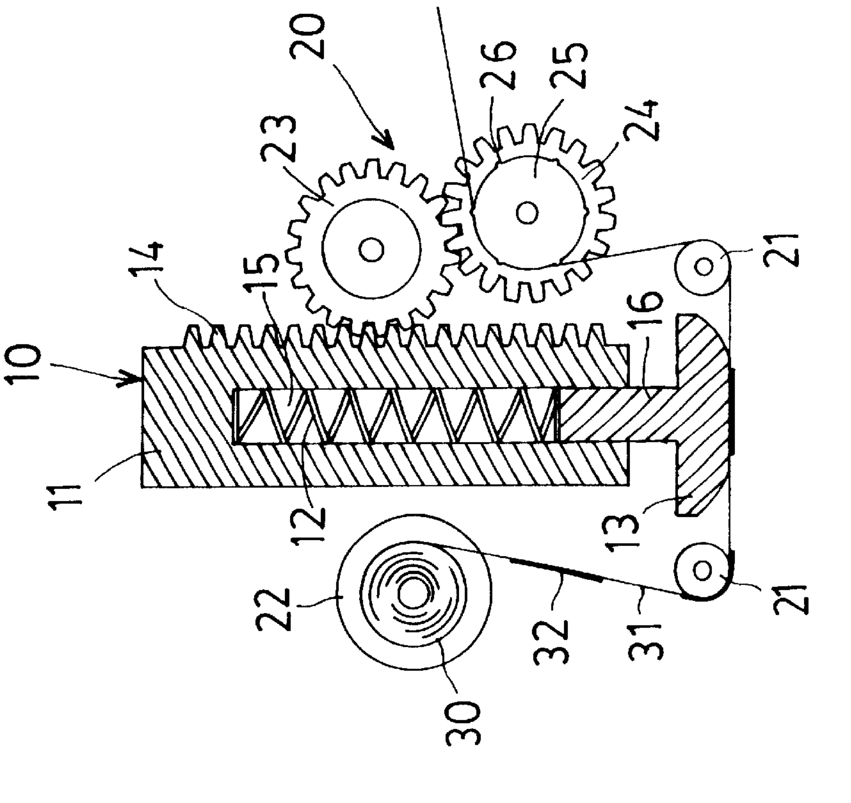
FIG. 5 is a structural isometric drawing of the second preferred embodiment of the invention herein.

Referring to FIG. 5, the driven gear (20) is positioned on the first wheel member (22) on one side of the pressed portion (13) and does not have to mesh with the gear teeth (14) on the side of the press-down portion (11); that means, the sticker body (30) positioned on the first wheel member (22) mainly uses the turning of the third wheel member (24) and the positioning holes (33) dragged by the convex portions (26) on the dragging wheel (25) to release oilpaper (31) in segments.

Figure 6:
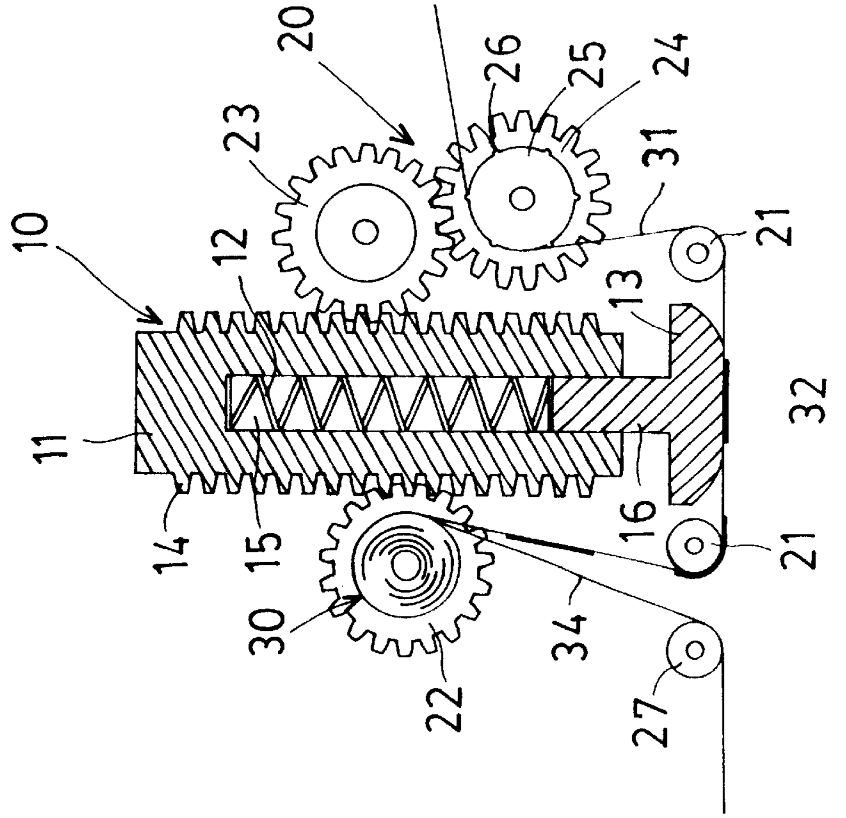
FIG. 6 is a structural isometric drawing of the third preferred embodiment of the invention herein.

Referring to FIG. 6, the driven gear (20) can be added with a rolling wheel (27); as the bottom side of the adhesive pattern (32) used for the sticker machine is covered by the translucent film (34), the translucent film (34) will be separated from the adhesive pattern (32) through the rolling wheel (27) and moves outwards to enable the adhesive pattern (32) to move smoothly to the bottom side of the pressed portion (13) of the arresting gear (10) and to be adhered to the predetermined location under the downward pressure of the press-down portion (11).

One aspect worthy of mentioning is that since the first and the second wheel members (22, 23) are one-way wheels, the situation of pulling the sticker body (30) toward the reverse direction will be avoided to increase the precision of adhering the sticker body (30).

In summation of the foregoing sections, the sticker machine of the invention herein fully complies with the patent application requirement of being industrial usable, innovative and progressive, and is hereby submitted to the patent bureau for review and the granting of the commensurate patent for ensuring the inventor's right.

The foregoing names used for all the members and illustrations are for the convenient description of the structure of the invention herein but not for restricting the patent field of the invention herein; therefore, any modified or substitute members based on the innovative spirit, the space and the style of the invention herein should be included within the patent scope of the invention herein.

What is claimed is:

1. A sticker machine with pressure applying structure comprising:

a) an arresting gear having a press-down portion with two sides, a resilient spring and a pressed portion, the press-down portion has gear teeth positioned on sides thereof and a receiving chamber mounted at a center of the press-down portion for receiving the resilient spring, the pressed portion is disposed at a bottom side of the press-down portion with a projecting rod located at a center inserted into the receiving chamber;

b) a driven gear mechanism including a set of auxiliary wheels, and first, second and third wheel members, wherein the set of auxiliary wheels is positioned on two sides of the pressed portion, the first and second wheel members are mounted on two sides of the press-down portion, and the third wheel member meshes with the second wheel member; and c) a sticker body having oilpaper and adhesive patterns, the adhesive patterns being located on a lower surface of the oilpaper with an adhesive layer coated at a bottom side; whereby, when the press-down portion of the arresting gear is depressed downwards, the pressed portion is also pressed downwards to synchronously turn the first and the second wheel members, which turns the third wheel member, thereby moving the adhesive patterns of the sticker body to the bottom side of the pressed portion to be pressed by the arresting gear and to be adhered to predetermined locations.

2. The sticker machine with pressure applying structure according to claim 1 wherein the first and second wheel members are one-way wheels.

3. The sticker machine with pressure applying structure according to claim 1 wherein the gear teeth mounted on the sides of the press-down portion of the arresting gear mesh with the second wheel member.

4. The sticker machine with pressure applying structure according to claim 3, wherein the gear teeth mounted on the sides of the press-down portion of the arresting gear mesh with the first and second wheel members.

5. The sticker machine with pressure applying structure according to claim 1 wherein the sticker body is rolled on the first wheel member, such that, when the first wheel member turns, the sticker body positioned on the first wheel member will gradually move toward the bottom side of the pressed portion.

6. The sticker machine with pressure applying structure according to claim 1 further comprising a dragging wheel mounted at a center of the third wheel member, the dragging wheel having convex portions on a circumferential ring, the convex portions of the dragging wheel interlocking with positioning holes in the oilpaper of the sticker body, such that, when the third wheel member turns the convex portions of the dragging wheel will forcefully engage the positioning holes to release the oilpaper outwards.

7. The sticker machine with pressure applying structure according to claim 1 wherein the driven gear has a rolling wheel for separating a translucent film of the sticker body from the adhesive patterns before the adhesive pattern is moved to the pressed portion.

* * * * *